UNITED STATES PATENT OFFICE.

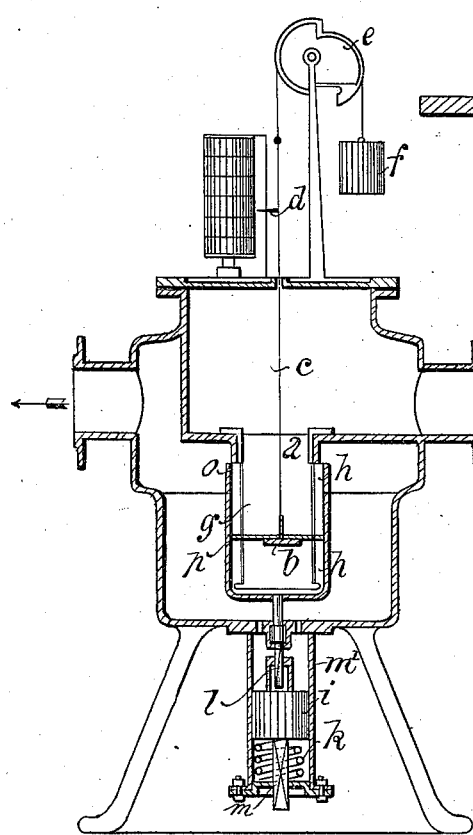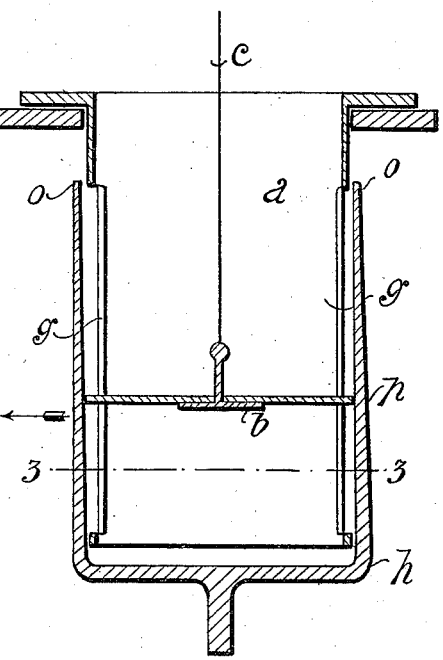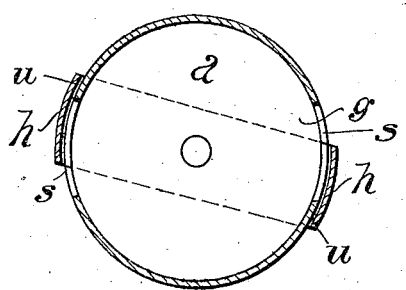

CARL FRIEDRICH SIMON, OF STOLBERG, GERMANY.

RECORDING APPARATUS FOR MEASURING GASEOUS FLUIDS.

1,028,145.
Specification of Letters Patent. Patented June 4, 1912.
Application filed July 24, 1911. Serial No. 640,300.

*To all whom it may concern:*

Be it known that I, CARL FRIEDRICH SIMON, a subject of the German Emperor, and residing at Stolberg, Rhenish Prussia, Germany, have invented certain new and useful Improvements in Recording Apparatus for Measuring Gaseous Fluids, of which the following is a specification.

This invention relates to an improvement in or modification of the invention described in the United States patent granted November 21, 1911, No. 1,009,448. Said patent relates to devices for determining the weight of gaseous fluids and consisting of cylinders having variable passage openings of which the area is so varied under the influence of the fluctuating pressure of the gases or vapors that the weight of the gas or vapor passing therethrough is in a linear relation with regard to the vertical dimension of the passage openings. Now it has been found that in carrying out the operation according to the disclosure in said patent, that great frictional resistances occur between the two hollow cylinders, whereas if a small space is left between the cylinders for the purpose of obviating the friction, it gives rise to erroneous results. According to the present invention therefore a play or space of precisely determined dimensions is provided between the walls or surfaces of the elements effecting the variation of the cross section and the second passage or opening for the gases or vapors which is produced thereby is taken into account, so that the cross section of the main passage opening which is variable both in breadth and height together with the small passage opening which is variable in height, but is of a constant breadth, give the total cross sectional area of the flow.

A constructional example of the invention is shown in the accompanying drawing in which—

Figure 1 is a section of the device. Fig. 2 represents the cylinder with the piston or disk and slide on a larger scale and Fig. 3 is a cross section on the line 3—3 of Fig. 2.

The device shown corresponds in principle to the apparatus illustrated in the before mentioned patent. In the place of the two slotted cylinders however, movably and rotatably arranged within each other, the present construction shows only one cylinder which is immovable and provided with slots, a piston and shutter. Arranged in this cylinder $a$ is a snugly fitting disk or piston $b$ which is connected to a wire $c$ guided over a roller $e$ and carrying the writing stylus $d$ and a counter weight $f$. The piston $b$ determines the height or the level of the passage openings for the flow of gases or vapors.

The variation of the passage openings in the direction of their breadth is effected by a shutter $h$ overlapping the cylinder and operatively connected with a piston $i$ supported by buffer springs $k$ in a known manner. Upon the occurrence of pressure fluctuations the shutter $h$ is rotated by means of the twisted rod $l$ fixed against axial movement and actuated by guide $m$, movable with the piston $i$, the piston being confined to axial movement by square spindle $m$. This rotary motion of the slide may of course be effected in various ways without departing from the spirit of my invention.

Now in order to avoid the surface friction between the cylinder $a$ and the slide $h$ a space or opening $u$ is provided between these two parts. The passage of fluid through this space or opening $u$ is prevented at the top by an edge $o$ and at the lower end of the passage a tight joint is formed by the edge $p$ of the piston $b$. The opening $u$ confined at the top by the edge $o$ at the bottom by the edge $p$ and laterally by the outer wall of the cylinder $a$ and by the inner wall of the slide $h$, therefore represents a passage for the gases or for the steam and this passage together with the main open passage $s$ represents the required total cross sectional area of the flow at the time being, its total breadth being varied by the shutter $h$ under the influence of pressure fluctuations.

As the average velocity of the gases or vapors through the free cross section of the passage varies according to the size of the variable openings even if the pressure, temperature and specific piston load are constant, provision is made according to the present invention to construct the roller $e$ from which the counter weight $f$ of the piston $b$ is suspended, in the form of a cam disk so as to enable the specific load of the piston to be varied according to the position or level of the piston whereby for a constant pressure and constant temperature, the same velocity of the flowing gases or vapors is attained for any desired position of the piston.

I claim:—

1. In a meter for gaseous fluids, the combination of a container having inlet and outlet openings, and means forming a variable passage for fluid therethrough, such means including members spaced apart and movable with respect to each other to provide a passage of constant width and a passage of variable width, means forming a wall for said opening of constant width confining the gaseous fluid to a path of movement through said opening adjacent said wall, and a device movable with respect to said members for varying the length of said passages.

2. In a meter for gaseous fluids, the combination of a slotted stationary cylinder disposed in the path of movement of the gaseous fluid, a piston for said cylinder, a shutter revoluble with respect to said cylinder for controlling the passages formed by the slots therein and spaced apart from said cylinder a predetermined distance, means forming a wall between said cylinder and shutter, and means carried by said piston forming the complementary walls to said last mentioned means to provide an opening of predetermined area for passage of gaseous fluids.

3. In an automatic recording apparatus for gaseous fluids, the combination of a vertically disposed slotted stationary cylinder, a piston movable in said cylinder, a shutter adapted to vary the openings formed by the said slots in said cylinder, a pivoted member including a cam disk, means operatively connecting said disk and pivoted member to rotate the latter in one direction subject to pressure upon said piston, and a counter weight for said piston operatively connected to said pivoted member, the said cam disks being such that the variation of the velocities of the gases or vapors produced by the variations of the positions of the said shutter and piston for a constant pressure and constant temperature of the gases or vapors to be measured are equalized by correspondingly varying the specific load on said piston.

4. A meter for gaseous fluids comprising in combination, a container having inlet and outlet means, a vertically disposed cylindrical shell having longitudinally extending slots for the passage of gaseous fluids therethrough, a shutter spaced apart from said cylindrical shell and movable with respect thereto to alter the area of the opening formed by the said slots, means for actuating said shutter responsive to actuations of current pressure, a piston in said cylinder adapted to vary its position responsive to fluctuations of said pressure thereby altering the area of the passages formed by the said slots, means forming a wall adjacent the upper margin of said slots and said shutter, and means carried by said piston forming a wall between said slots and said shutter whereby an opening for gaseous fluids is provided between said shutter and cylindrical shell of constant width and variable length, substantially as and for the purpose set forth.

In testimony whereof I affix my signature in presence of two witnesses.

CARL FRIEDRICH SIMON.

Witnesses:
 FRITZ HOLLEWERK,
 HENRY CUADFLIEG.

---

Copies of this patent may be obtained for five cents each, by addressing the "Commissioner of Patents, Washington, D. C."